(12) United States Patent
Whelan et al.

(10) Patent No.: US 10,612,995 B2
(45) Date of Patent: Apr. 7, 2020

(54) NONDESTRUCTIVE INSPECTION TOOLS FOR TIMBER DISTRIBUTION POLES, AND RELATED METHODS

(71) Applicants: Duke Energy Corporation, Charlotte, NC (US); The University of North Carolina at Charlotte, Charlotte, NC (US)

(72) Inventors: Matthew Whelan, Charlotte, NC (US); Jerry Ivey, York, SC (US); Steven Mitchell Dulin, Fort Mill, SC (US)

(73) Assignees: Duke Energy Corporation, Charlotte, NC (US); The University of North Carolina at Charlotte, Charlotte, NC (US)

( * ) Notice: Subject to any disclaimer, the term of this patent is extended or adjusted under 35 U.S.C. 154(b) by 12 days.

(21) Appl. No.: 16/034,182

(22) Filed: Jul. 12, 2018

(65) Prior Publication Data

US 2019/0017896 A1  Jan. 17, 2019

Related U.S. Application Data

(60) Provisional application No. 62/531,589, filed on Jul. 12, 2017, provisional application No. 62/696,675, filed on Jul. 11, 2018.

(51) Int. Cl.
*G01M 5/00* (2006.01)
(52) U.S. Cl.
CPC ........ *G01M 5/0066* (2013.01); *G01M 5/0033* (2013.01)
(58) Field of Classification Search
CPC .......................... G01M 5/0066; G01M 5/0033
See application file for complete search history.

(56) References Cited

U.S. PATENT DOCUMENTS

| | | | |
|---|---|---|---|
| 3,066,525 A | 12/1962 | Harris | |
| 3,345,861 A | 10/1967 | Heath | |
| 3,521,483 A | 7/1970 | Miller et al. | |
| 3,531,983 A | 10/1970 | Heath et al. | |
| 3,877,294 A | 4/1975 | Shaw | |
| 4,059,988 A | 11/1977 | Shaw | |
| 4,329,882 A | 5/1982 | Kaup | |

(Continued)

FOREIGN PATENT DOCUMENTS

EP    2028473    2/2009

OTHER PUBLICATIONS

Kernicky et al. "Structural Identification and Damage Characterization of a Masonry Infill Wall in a Full-Scale Building Subjected to Internal Blast Load" Journal of Structural Engineering 141(1):D4014013-1-13 (Jan. 2015).

*Primary Examiner* — David Z Huang
(74) *Attorney, Agent, or Firm* — Myers Bigel, P.A.

(57) ABSTRACT

Electronic nondestructive inspection tools for timber distribution poles are provided herein. An electronic nondestructive inspection tool includes a vibration sensor configured to perform a vibration measurement of a timber distribution pole. In some embodiments, the electronic nondestructive inspection tool includes a processor configured to perform operations including estimating decay of the timber distribution pole, using the vibration measurement and a physics model of the timber distribution pole; and outputting an indication of the decay of the timber distribution pole. Related methods are also provided.

22 Claims, 10 Drawing Sheets

(56) References Cited

U.S. PATENT DOCUMENTS

| | | | |
|---|---|---|---|
| 4,350,044 | A | 9/1982 | Richardson et al. |
| 4,399,701 | A | 8/1983 | Dunlop |
| 4,571,999 | A | 2/1986 | Arita et al. |
| 4,702,111 | A | 10/1987 | Holland |
| 4,858,469 | A | 8/1989 | Hosgood et al. |
| 4,926,691 | A | 5/1990 | Franklin et al. |
| 5,396,799 | A | 3/1995 | Ross et al. |
| 5,804,728 | A | 9/1998 | Beall et al. |
| 6,029,522 | A | 2/2000 | Schafer et al. |
| 6,246,355 | B1 | 6/2001 | Miceli et al. |
| 6,276,209 | B1 | 8/2001 | Schafer et al. |
| 7,043,990 | B2 | 5/2006 | Wang et al. |
| 8,630,813 | B2 | 1/2014 | Piazza et al. |
| 2005/0011249 | A1* | 1/2005 | Mahaffey .............. G01M 7/08 73/12.01 |
| 2008/0255809 | A1 | 10/2008 | Ran et al. |
| 2014/0069192 | A1 | 3/2014 | Bartuli et al. |
| 2015/0355144 | A1* | 12/2015 | Bartuli ................ G01N 29/12 73/579 |

\* cited by examiner

NONDESTRUCTIVE INSPECTION TOOLS FOR TIMBER DISTRIBUTION POLES, AND RELATED METHODS

RELATED APPLICATIONS

The present application claims the benefit of U.S. Provisional Patent Application No. 62/531,589, filed Jul. 12, 2017, and U.S. Provisional Patent Application No. 62/696,675, filed Jul. 11, 2018, the disclosures of which are hereby incorporated herein in their entireties by reference.

FIELD

The present disclosure relates to tools for inspecting timber distribution poles.

BACKGROUND

Timber distribution poles, which support electrical distribution systems, are susceptible to decay and section loss due to insects, fungi, and rot. Linemen servicing components on timber distribution poles must quickly assess the structural safety of these poles. Unfortunately, decay and section loss of the poles frequently occur below the ground line and thus are not readily detected.

SUMMARY

A first electronic device configured to perform vibration-based condition assessment of a timber distribution pole, according to some embodiments herein, may include a vibration sensor configured to perform a vibration measurement of the timber distribution pole. The first electronic device may include wireless communications circuitry configured to provide wireless communications with a second electronic device that is spaced apart from the timber distribution pole. The first electronic device may include a processor. The first electronic device may include a storage medium coupled to the processor and including computer readable program code that when executed by the processor causes the processor to perform operations including estimating decay of the timber distribution pole, using the vibration measurement and a physics model of the timber distribution pole. Moreover, the first electronic device may include an output interface configured to output an indication of the decay of the timber distribution pole to a user of the first electronic device.

In some embodiments, the indication of the decay may include an indication of whether it is safe for the user to climb the timber distribution pole. The output interface may include an indicator light, a speaker, and/or a display screen of the first electronic device that is configured to output the indication of whether it is safe for the user to climb the timber distribution pole. Additionally or alternatively, the vibration sensor may include an accelerometer having a full-scale range of at least +/−20 g of acceleration and a bandwidth of at least 200 Hertz.

According to some embodiments, the first electronic device may include a housing including a curved attachment surface that is attachable to a curved outer surface of the timber distribution pole. Additionally or alternatively, the wireless communications circuitry may include Wi-Fi circuitry, Bluetooth circuitry, and/or cellular communications circuitry.

A method of vibration-based condition assessment of a timber distribution pole, according to some embodiments herein, may include performing, at an electronic device that is attached to the timber distribution pole, a vibration measurement of the timber distribution pole, independently of boring into the timber distribution pole and independently of excavating soil adjacent the timber distribution pole. The method may include estimating, at the electronic device, decay of the timber distribution pole, using the vibration measurement and a physics model of the timber distribution pole. Moreover, the method may include outputting, at the electronic device, an indication of the decay of the timber distribution pole to a user of the electronic device.

In some embodiments, the decay may be an unknown parameter value of the physics model, and estimating the decay may include iteratively solving for the unknown parameter value. In some embodiments, the unknown parameter value may be a first unknown parameter value of the physics model. The first unknown parameter value may represent loss of an area of the timber distribution pole that is below a ground line of the timber distribution pole. Moreover, the method may include iteratively solving for second and third unknown parameter values of the physics model representing an elastic modulus of the timber distribution pole and an elastic modulus of soil adjacent the timber distribution pole, respectively.

According to some embodiments, known parameter values of the physics model may include values representing embedment of the timber distribution pole, density of the timber distribution pole, and one or more dimensions of the timber distribution pole. In some embodiments, the known parameter values of the physics model may also include a value representing supported mass of the timber distribution pole and/or a value representing added stiffness of the timber distribution pole.

In some embodiments, the unknown parameter value is one among a plurality of unknown parameter values of the physics model, and the plurality of unknown parameter values may also include a value representing supported mass of the timber distribution pole and/or a value representing added stiffness of the timber distribution pole.

According to some embodiments, the indication of the decay may include an indication of whether it is safe for the user to climb the timber distribution pole. Moreover, outputting the indication of the decay may include illuminating an indicator light of the electronic device, providing sound via a speaker of the electronic device, and/or displaying a representation of the decay via a display screen of the electronic device, to provide the indication of whether it is safe for the user to climb the timber distribution pole. Additionally or alternatively, outputting the indication of the decay may include transmitting, via a short-range wireless communications link, data representing the decay to another electronic device of the user.

In some embodiments, the method may include receiving, via a short-range wireless communications link with another electronic device of the user, a user input from the user. The vibration measurement and/or estimating the decay may be performed in response to receiving the user input.

According to some embodiments, performing the vibration measurement may include performing a first vibration measurement of the timber distribution pole with respect to a first axis that extends through the timber distribution pole. Moreover, the method may include performing a second vibration measurement of the timber distribution pole with respect to a second axis that extends through the timber distribution pole and intersects the first axis.

In some embodiments, the first and second vibration measurements may be performed while the electronic device is attached to the timber distribution pole at an elevation in a range of about 4 feet to about 6 feet relative to a ground line of the timber distribution pole. Moreover, estimating the decay may include estimating a first decay parameter value of the timber distribution pole with respect to the first axis; and estimating a second decay parameter value of the timber distribution pole with respect to the second axis. In some embodiments, the method may include identifying a structurally weaker one of the first axis and the second axis by comparing the first decay parameter with the second decay parameter; and physically reinforcing a portion of an outer surface of the timber distribution pole that is intersected by the structurally weaker one of the first axis and the second axis.

According to some embodiments, performing the vibration measurement may include measuring, via an accelerometer of the electronic device having a full-scale range of at least +/−20 g of acceleration and a bandwidth of at least 200 Hertz, natural and anti-resonance frequencies while the electronic device is attached to the timber distribution pole at an elevation that is in a range of about 4 feet to about 6 feet relative to a ground line of the timber distribution pole. Additionally or alternatively, estimating the decay may include using natural frequencies and/or anti-resonance frequencies from the vibration measurement to identify a plurality of parameter values for the physics model through an optimization algorithm.

An electronic nondestructive inspection tool for timber distribution poles, according to some embodiments herein, may include a vibration sensor configured to perform a vibration measurement of a timber distribution pole. Moreover, the electronic nondestructive inspection tool may include a processor configured to perform operations including: estimating decay of the timber distribution pole, using the vibration measurement and a physics model of the timber distribution pole; and outputting an indication of the decay of the timber distribution pole to a user of the electronic nondestructive inspection tool.

In some embodiments, the electronic nondestructive inspection tool may include wireless short-range communications circuitry configured to provide wireless short-range communications with a portable electronic device of the user. The wireless short-range communications may include data representing the indication of the decay of the timber distribution pole. Moreover, the vibration sensor may include an accelerometer having a full-scale range of at least +/−20 g of acceleration and a bandwidth of at least 200 Hertz. Additionally or alternatively, the electronic nondestructive inspection tool may include an output interface configured to visibly and/or audibly output the indication of the decay of the timber distribution pole to the user; and a storage medium coupled to the processor and including computer readable program code that when executed by the processor causes the processor to perform the operations.

DETAILED DESCRIPTION

Pursuant to embodiments of the present inventive concepts, electronic devices configured to perform vibration-based condition assessment of timber distribution poles are provided. These electronic devices are nondestructive inspection tools that do not require excavation, boring, or other destruction of the timber distribution poles or adjacent soil.

Conventional techniques of condition assessment of timber distribution poles include formal and informal levels of inspection. One example of the formal level is a formal inspection that includes excavating around the base of a pole to access the area of the pole that is below the ground line, which is where hidden decay from fungus and rot may primarily occur. This hidden area of decay may be the largest safety hazard for linemen who will climb, or otherwise access, the pole. A formal inspection of this hidden area may include an extensive investigation of the health of the pole.

The informal level of inspection, on the other hand, may simply involve a lineman using a hammer and a screwdriver. For example, the lineman may hit the pole with a hammer and listen to the responding sound. The lineman may also poke at the exposed surface of the pole with, for example, a screwdriver, to feel for soft spots near the ground line.

In contrast with such conventional techniques, embodiments of the present inventive concepts described herein provide a nondestructive condition assessment (i.e., inspection) tool that can be provided directly to a lineman who is not trained in nondestructive evaluation or condition assessment. The tool gives the lineman an indication of the health of the pole, with more precision and accuracy than conventional informal techniques and without the destructive, time-consuming, and labor-intensive nature of conventional formal techniques. Linemen using nondestructive condition assessment methods and devices according to embodiments of the present inventive concepts may therefore assess pole health in a manner that improves safety and reduces costs.

Example embodiments of the present inventive concepts will be described in greater detail with reference to the attached figures.

Figure 1A:
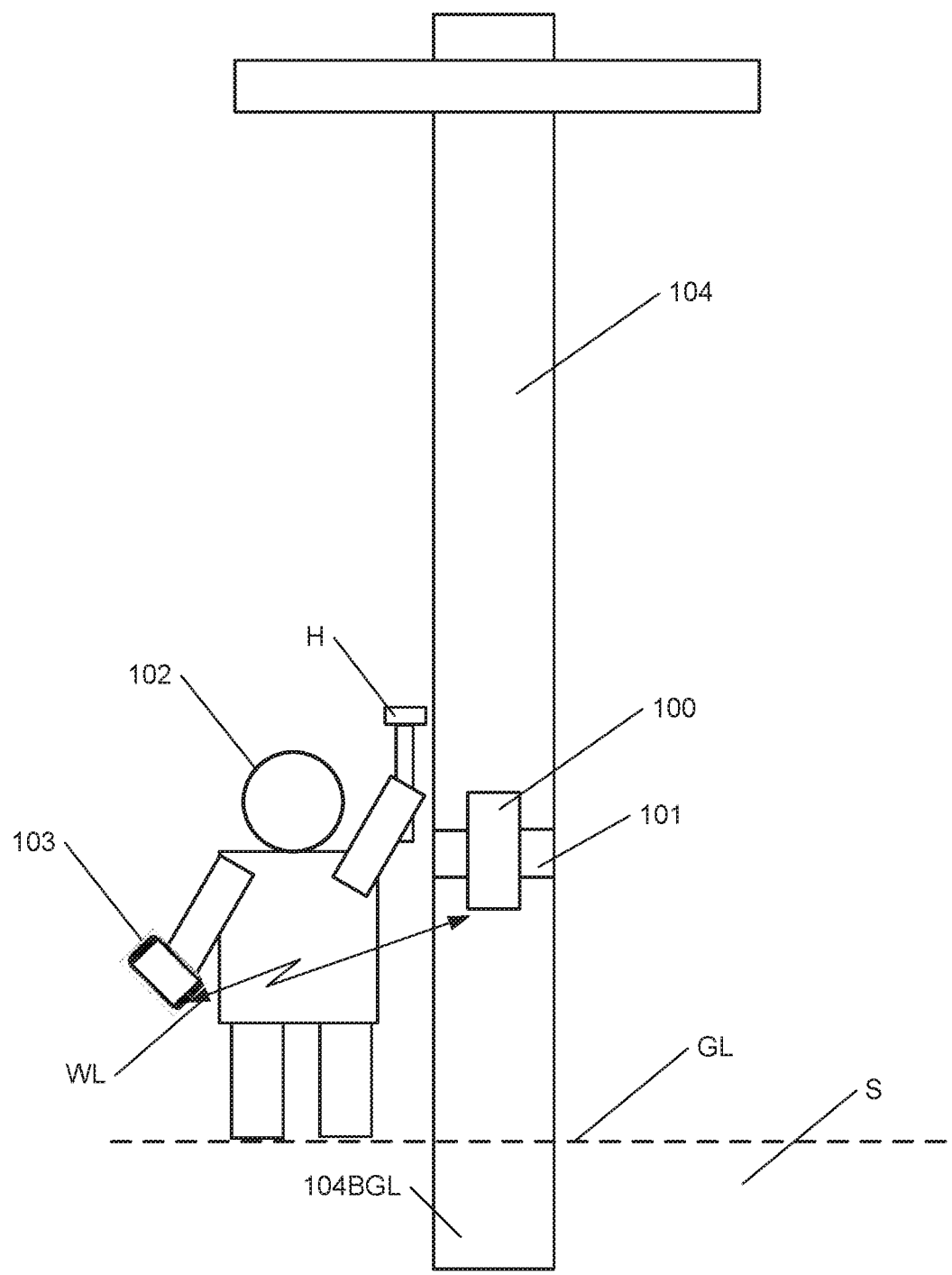
FIG. 1A is a diagram illustrating vibration-based condition assessment of a timber distribution pole via an electronic device according to embodiments of the present inventive concepts.

FIG. 1A is a diagram illustrating vibration-based condition assessment of a timber distribution pole 104 via an electronic device 100 according to embodiments of the present inventive concepts. As shown in FIG. 1A, the electronic device 100 may be attached to the pole 104. For example, a strap 101, which may wrap around a circumference of the pole 104, may be used to attach the electronic device 100 to the pole 104.

A user 102 of the electronic device 100 may attach the electronic device 100 to the pole 104. While the electronic device 100 is attached to the pole 104, the user 102 may perform vibration-based condition assessment of the pole 104 via the electronic device 100. For example, the user 102 may strike the pole 104 with a hammer H, such as an impulse hammer, and the electronic device 100 may measure a vibration response of the pole 104 to the strike.

In addition to the electronic device 100, the user 102 may use another electronic device 103, which may be a smartphone, a tablet computer, a laptop computer, or one of various other portable/wireless electronic devices. The electronic devices 100 and 103 may communicate with each other via a short-range wireless communications link WL, such as a Wi-Fi or BLUETOOTH® link. For example, the user 102 may provide a user input to the electronic device 103 that is communicated to the electronic device 100 via the link WL. As another example, the electronic device 100 may transmit data (e.g., status/result data) regarding the vibration-based condition assessment of the pole 104 to the electronic device 103 via the link WL.

The vibration-based condition assessment of the pole 104 may be performed to determine a level (e.g., severity) of decay of a portion 104BGL of the pole 104 that is below a ground line GL. As the pole 104 is embedded in soil S below the ground line GL, the decay of the portion 104BGL may otherwise be concealed from the user 102, who may be a lineman of an electric utility. By using the electronic device 100 to assess the decay of the portion 104BGL, however, the user 102 may quickly and nondestructively determine whether the pole 104 is safe to climb.

Figure 1B:
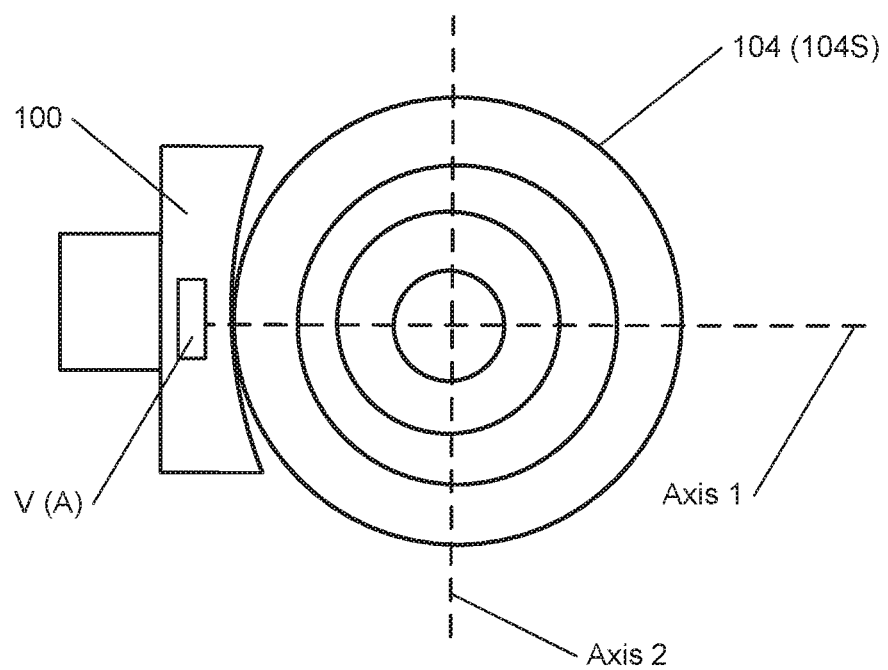
FIG. 1B is a cross-sectional view of a timber distribution pole having an electronic device attached thereto according to embodiments of the present inventive concepts.

FIG. 1B is a cross-sectional view of a timber distribution pole 104 having an electronic device 100 attached thereto according to embodiments of the present inventive concepts. In particular, FIG. 1B shows a horizontal plane in which the electronic device 100 is on an outer surface 104S of the pole 104. The electronic device 100 may include one or more vibration sensors V, which may comprise accelerometers A. For example, one or more accelerometers A may measure a vibration response of the pole 104 along an axis, such as Axis 1. As an example, the vibration response along Axis 1 may be measured for a strike of a hammer H at a point of the pole 104 that is along or adjacent Axis 1. Similarly, the vibration response along another axis, such as Axis 2, that intersects Axis 1 may be measured for a strike of the hammer H at a point of the pole 104 that is along or adjacent Axis 2. In some embodiments, Axis 1 and Axis 2 may be perpendicular to each other.

An accurate and high resolution vibration measurement with an accurate time base may be beneficial in the context of timber distribution poles 104. Accordingly, a vibration sensor V may comprise a low-noise accelerometer A that has a full-scale range of at least about +/−20 g of acceleration and a bandwidth of at least about 200 Hertz (Hz). For example, in some embodiments, the low-noise accelerometer A may have a full-scale range of at least about +/−50 g of acceleration and a bandwidth of at least about 400 Hz. In contrast with a low-noise accelerometer A, smartphone accelerometers may have an insufficient time base for the present inventive concepts when used with the poles 104. Moreover, the vibrations of a pole 104 are sufficiently intense that a smartphone accelerometer would likely be saturated. In some embodiments, operations of vibration-measurement operations described herein may include identifying an error in a time base of a measurement by the accelerometer A of an electronic device 100 and calibrating a sampling clock of the electronic device 100 to rectify the error and thereby improve the accuracy of natural frequency estimates. Alternatively, the accelerometer A may be replaced with a higher-performance accelerometer A.

Figure 1C:
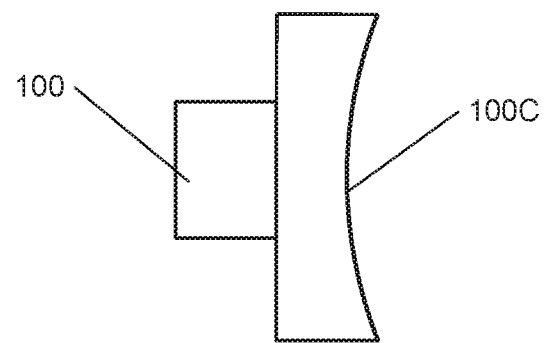
FIG. 1C is a top view of an electronic device that is attachable to a timber distribution pole according to embodiments of the present inventive concepts.

FIG. 1C is a top view of an electronic device 100 that is attachable to a timber distribution pole 104 according to embodiments of the present inventive concepts. As shown in FIG. 1C, a housing (e.g., case) of the electronic device 100 may include a curved attachment surface 100C that is attachable to a curved outer surface 104S (FIG. 1B) of the pole 104. Because the shape of the attachment surface 100C substantially conforms to the shape of the outer surface 104S, the electronic device 100 can fit securely on the pole 104.

Figure 1D:
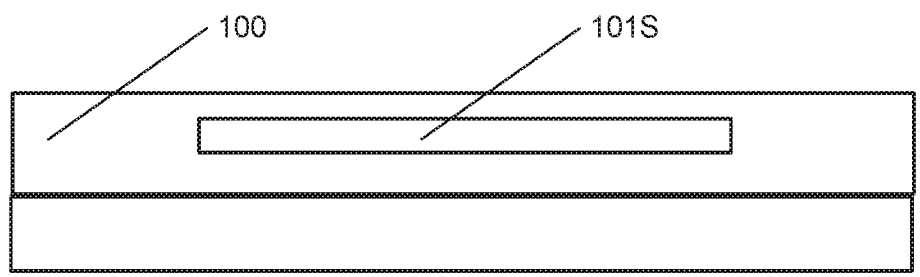
FIG. 1D is a side view of an electronic device that is attachable to a timber distribution pole according to embodiments of the present inventive concepts.

FIG. 1D is a side view of an electronic device 100 that is attachable to a timber distribution pole 104 according to embodiments of the present inventive concepts. In addition to, or as an alternative, to the curved attachment surface 100C of FIG. 1C, the housing of the electronic device 100 may include a slot 101S through which a strap 101 (FIG. 1A) may extend to wrap around the pole 104. In some embodiments, the strap 101 may be adjustable, so that it may be tightened to fit securely on the pole 104. Although the electronic device 100 may be temporarily attached to the pole 104 via the strap 101, the electronic device 100 may, in some embodiments, be more permanently attached to the pole 104, such as by a metal bracket or other more permanent attachment structure.

Figure 1E:
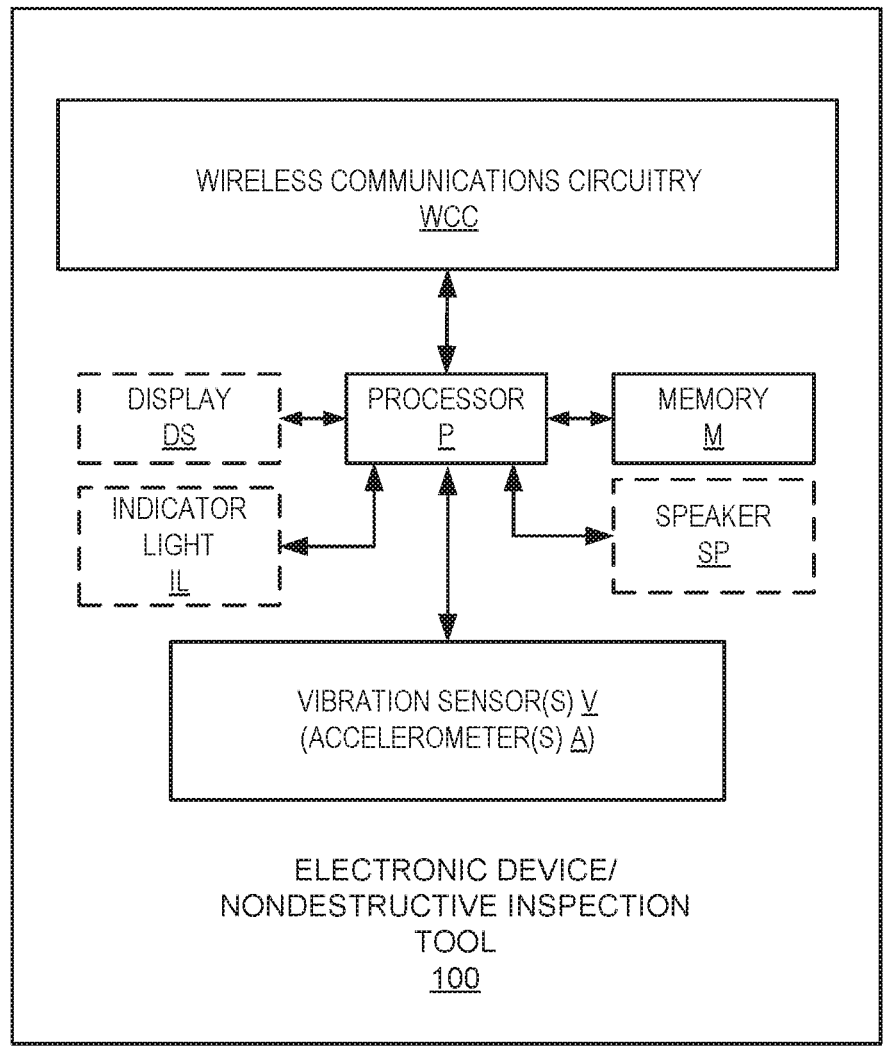
FIG. 1E is a block diagram of an electronic device that is attachable to a timber distribution pole according to embodiments of the present inventive concepts.

FIG. 1E is a block diagram of an electronic device 100 that is attachable to a timber distribution pole 104 according to embodiments of the present inventive concepts. The electronic device 100 may include a processor P and a memory M. The electronic device 100 may also include wireless communications circuitry WCC and one or more vibration sensors V, such as one or more accelerometers A. Moreover, the electronic device 100 may, in some embodiments, include one or more output interfaces that are configured to visibly and/or audibly output an indication of decay of the pole 104 to a user 102 of the electronic device 100. For example, the output interface(s) may include a display screen DS, an indicator light IL, and/or a speaker SP. In some embodiments, the display screen DS may comprise a touchscreen display.

The processor P may be coupled to the wireless communications circuitry WCC. The processor P may be configured to communicate with an electronic device 103 (FIG. 1A) via the wireless communications circuitry WCC. For example, the wireless communications circuitry WCC may include short-range wireless communications circuitry, such as Wi-Fi circuitry and/or BLUETOOTH® circuitry. Additionally or alternatively, the wireless communications circuitry WCC may include cellular communication circuitry that provides a cellular wireless interface (e.g., 3G/4G/5G/LTE, other cellular). In some embodiments, the electronic device 103, unlike the electronic device 100, may not be attached to the pole 104. Rather, the electronic device 103 may be spaced apart from the pole 104. For example, the electronic device 103 may be held by the user 102 or may be inside a vehicle of the user 102.

After receiving short-range communications from the electronic device 100, the electronic device 103 may then transmit, via a cellular network, data based on the short-range communications to a server (e.g., at a data center) or another electronic device that is spaced apart from the pole 104, to track the condition of the pole 104 over time, such as over multiple years. For example, the server or other electronic device may be at a utility office that is one or more miles away from the pole 104. As an example, the server or other electronic device may be part of a utility head end system. Additionally or alternatively, the electronic device 100 may directly communicate via cellular communications with the server or other electronic device.

The electronic device 100 may be a low-cost, rapid, and portable inspection tool that is configured to assess the presence and severity of section loss below the ground line GL (FIG. 1A) for timber distribution poles 104. In particular, the electronic device 100 may use a low-cost accelerometer A to implement a vibration-based nondestructive condition assessment technique to address technical challenges associated with assessing the health of poles 104 below the ground line GL. Moreover, the electronic device 100 may enhance user-friendliness by providing an unambiguous indication to a user 102 of the electronic device 100 regarding whether it is safe to climb a particular pole 104.

Figure 1F:
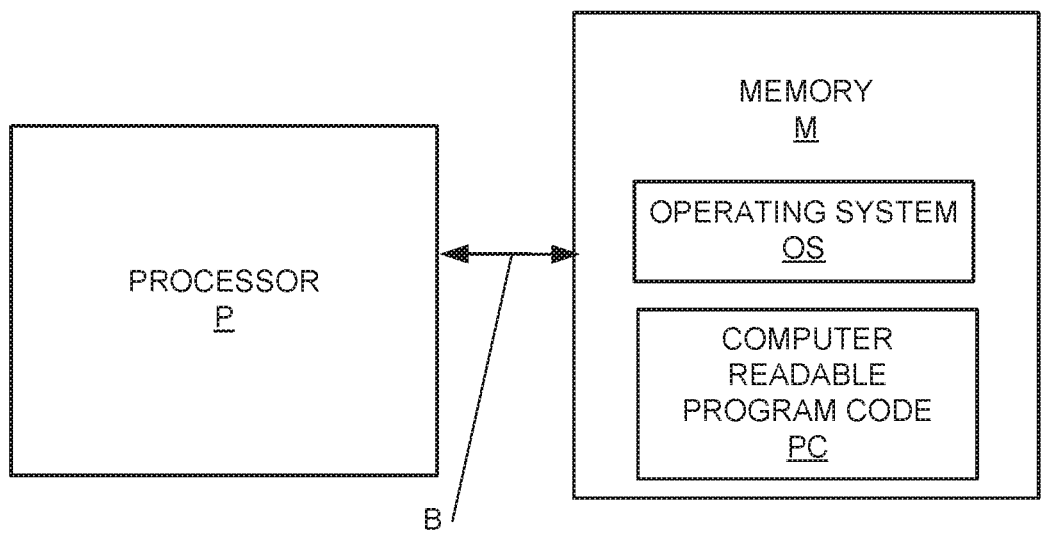
FIG. 1F is a block diagram that illustrates details of an example processor and memory that may be used in accordance with various embodiments.

FIG. 1F is a block diagram that illustrates details of an example processor P and memory M that may be used in accordance with various embodiments. The processor P communicates with the memory M via an address/data bus B. The processor P may be, for example, a commercially available or custom microprocessor. Moreover, the processor P may include multiple processors. The memory M may be a non-transitory computer readable storage medium and may be representative of the overall hierarchy of memory devices containing the software and data used to implement various functions of an electronic device 100 as described herein. The memory M may include, but is not limited to, the following types of devices: cache, ROM, PROM, EPROM, EEPROM, flash, Static RAM (SRAM), and Dynamic RAM (DRAM).

As shown in FIG. 1F, the memory M may hold various categories of software and data, such as computer readable program code PC and/or an operating system OS. The operating system OS controls operations of an electronic device 100. In particular, the operating system OS may manage the resources of the electronic device 100 and may coordinate execution of various programs by the processor P. The computer readable program code PC, when executed by the processor P, may cause the processor P to perform any of the operations illustrated in the flowcharts of FIGS. 1G to 1I. For example, the memory M of the electronic device 100 may include one or more algorithms that control operations illustrated in the flowcharts of FIG. 1G-1I.

Figure 1G:
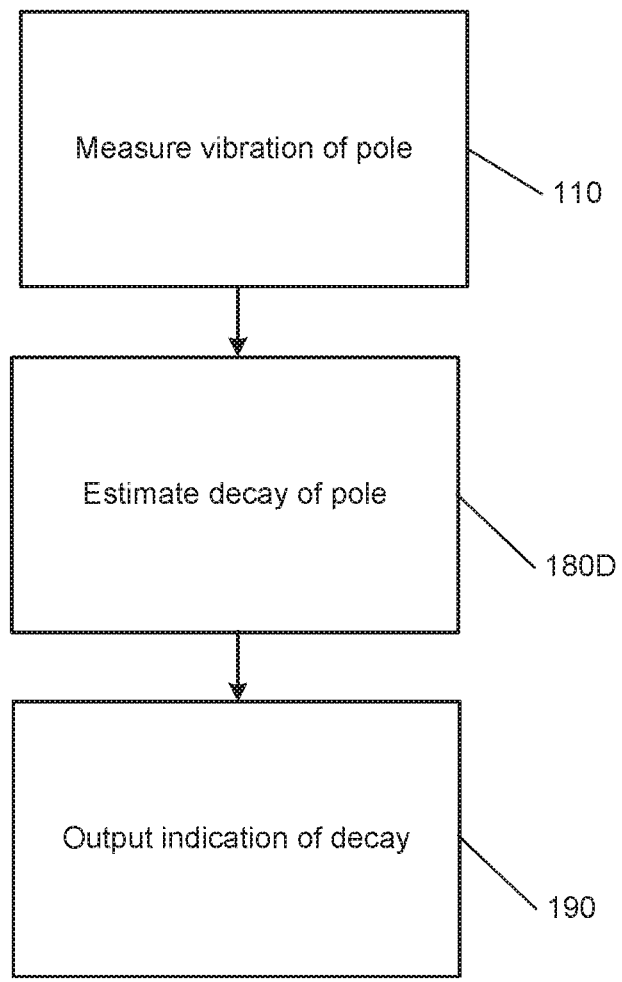
FIGS. 1G to 1J are flowcharts of operations for vibration-based condition assessment of a timber distribution pole according to embodiments of the present inventive concepts.
Figure 1H:
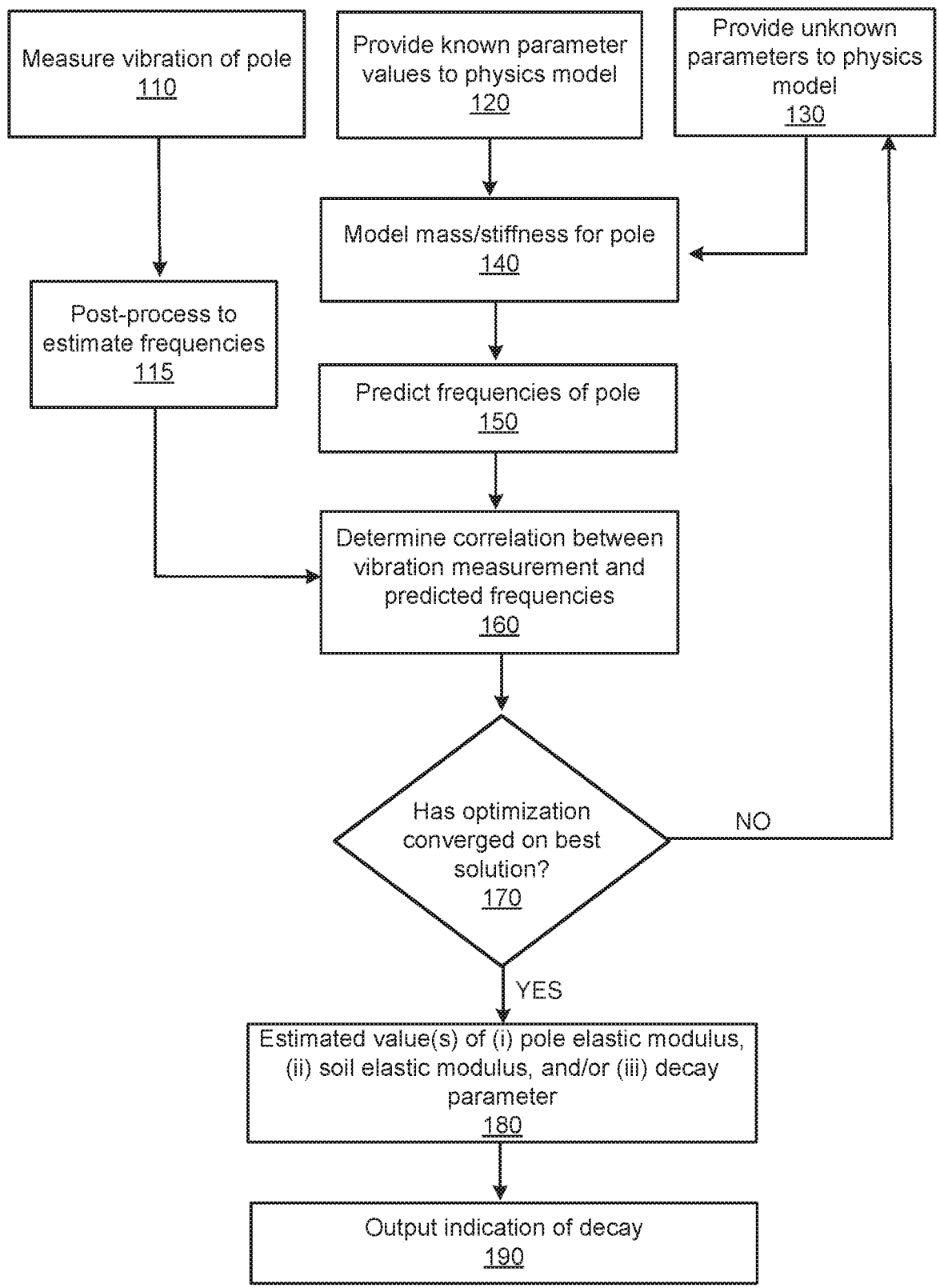
Figure 1I:
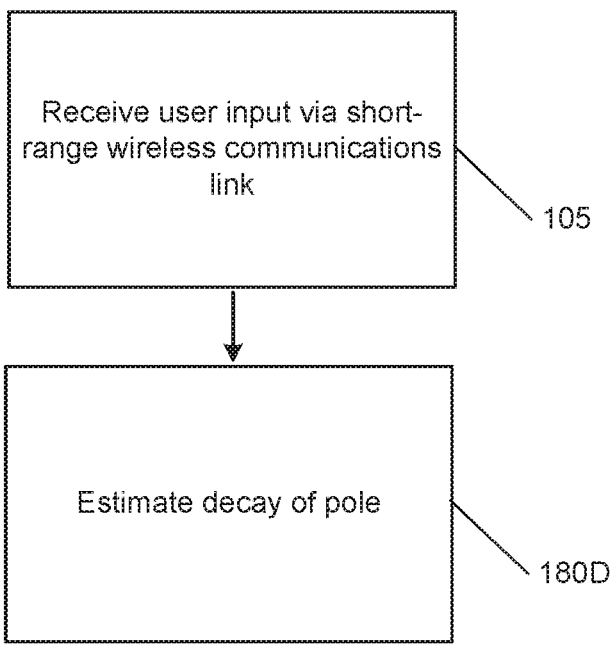
Figure 1J:
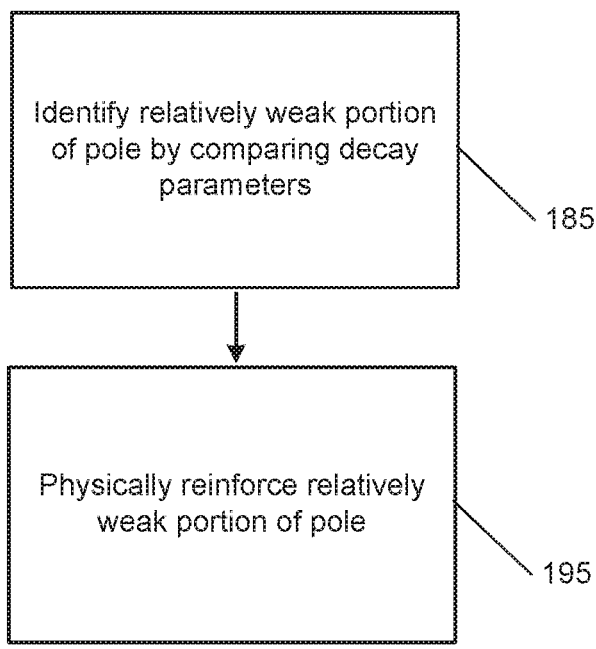

FIGS. 1G to 1J are flowcharts of operations for vibration-based condition assessment of a timber distribution pole 104 according to embodiments of the present inventive concepts. Although an electronic device 100 may be configured to perform any of the operations in the flowcharts of FIGS. 1G to 1I, one or more of the operations may, in some embodiments, be performed outside of the electronic device 100, such as by another electronic device 103. Moreover, the operation(s) of Block 195 of FIG. 1J is typically performed outside of the electronic device 100. As an example, the operation(s) of Block 195 of FIG. 1J may be performed using one or more mechanical tools.

Referring to FIG. 1G, operations for vibration-based condition assessment of a utility pole, such as a timber distribution pole 104, include measuring (Block 110) vibration of the pole 104. For example, the operation(s) of Block 110 may include performing, at an electronic device 100 that is attached to the pole 104, a vibration measurement of the pole 104, independently of boring into the pole 104 and independently of excavating soil S adjacent the pole 104.

In some embodiments, performing the vibration measurement may include measuring natural and anti-resonance frequencies while the electronic device 100 is attached to the pole 104 at an elevation that is in a range of about 4 feet to about 6 feet relative to a ground line GL of the pole 104. A vibration sensor V of the electronic device 100 should be at an elevation where the vibration response is significant enough to measure natural frequencies and anti-resonance frequencies. Examples of appropriate elevations include about 4 feet to about 6 feet because this range permits a vibration that is easily measurable, but also is not too high for a user 102 to reach. Accordingly, the vibration measurement may provide for estimating both natural frequencies and anti-resonance frequencies, thus generating more information about the system when solving for unknown parameters of a physics model of the pole 104. Although anti-resonance frequencies are not required, they may help enhance reliability of the determination of unknown parameters in the physics model of the pole 104.

Additionally or alternatively, performing the vibration measurement may include performing a first vibration measurement of the pole 104 with respect to a first axis (e.g., Axis 1 of FIG. 1B) that extends through the pole 104, and performing a second vibration measurement of the pole 104 with respect to a second axis (e.g., Axis 2 of FIG. 1B) that extends through the pole 104 and intersects the first axis. Decay may be non-uniform in the pole 104. For example, decay may be more severe along one axis than another axis. Accordingly, the electronic device 100 can test the pole 104 for two directions of motion (e.g., using one or more multiple-axis accelerometers A), which can supply more known parameter values to solve for unknown parameter values of the physics model and can help to determine the location in a cross-section of the pole 104 where the decay is most severe. Such integration of different axes of data may help to refine confidence in the detection of any decay below the ground line GL.

The first and second vibration measurements may, in some embodiments, be performed while the electronic device 100 is attached to the pole 104 at different first and second elevations relative to the ground line GL. For example, the first and second vibration measurements may both be performed at the first elevation and then may both be performed at the second elevation. The first elevation and/or the second elevation may be in a range of about 4 feet to about 6 feet. As used herein, the term "about" refers to a value that may vary by up to 10%. Accordingly, the term "about 4 feet" refers to 48 inches +/− up to 4.8 inches.

The operations of the FIG. 1G also include estimating (Block 180D) decay of the pole 104. As an example, the operation(s) of Block 180D may include estimating, at the electronic device 100, the decay of the pole 104, using the vibration measurement of Block 110 and a physics model of the pole 104. In some embodiments, estimating the decay may include estimating a first decay parameter value of the pole 104 with respect to a first axis (e.g., Axis 1 of FIG. 1B), and estimating a second decay parameter value of the pole 104 with respect to a second axis (e.g., Axis 2 of FIG. 1B). The decay parameter value(s) may indicate decay of a portion 104BGL (FIG. 1A) of the pole 104 that is below a ground line GL.

Moreover, the operations of FIG. 1G include outputting (Block 190) an indication of the decay of the pole 104. For example, the operation(s) of Block 190 may include outputting, at the electronic device 100, the indication of the decay of the pole 104 to a user 102 of the electronic device 100.

In particular, the indication of the decay may comprise an indication of whether it is safe for the user 102 to climb the pole 104.

The indication of whether it is safe to climb the pole 104 may be provided to the user 102 by (i) illuminating an indicator light IL (e.g., a light-emitting diode (LED)) of the electronic device 100, (ii) providing sound via a speaker SP of the electronic device 100, and/or (iii) displaying a representation of the decay via a display screen DS of the electronic device 100. As an example, the display screen DS may display the word "safe" when the pole 104 is safe to climb, and/or may display a numerical indication of the amount/severity of the decay. In addition to, or as an alternative to, providing an output via the indicator light IL, the speaker SP, and/or the display screen DS, the electronic device 100 may output the indication of the decay by transmitting, via short-range wireless communications, data representing the decay to another electronic device 103 of the user 102.

Referring to FIG. 1H, operations may include performing a vibration measurement (Block 110) of a timber utility distribution pole 104, as discussed herein with respect to FIG. 1G. For example, a user 102 (e.g., a lineman) of an electronic device 100 may take the vibration response of the pole 104 to estimate natural and/or anti-resonance frequencies of the pole 104. The lineman 102 may do so by, for example, taking the electronic device 100 (which includes an accelerometer A), attaching it to the pole 104, exciting it, and using the response measurement to estimate natural and/or anti-resonance frequencies. As an example, the vibration measurement (Block 110) may be post-processed (Block 115) by the electronic device 100 to estimate natural and/or anti-resonance frequencies. Automated system identification algorithms may be employed to perform this estimation of natural and/or anti-resonance frequencies from the response measurement without requiring any input from the lineman 102.

In parallel with performing data measurements, operations according to embodiments of the present inventive concepts may use an analytical/physics model to determine (a) whether decay is present in a pole 104 and (b) the extent of the decay. Using stiffness and mass matrices, the model may treat decay as both a loss of stiffness and mass over a specified region of the pole 104. In some embodiments, the model may be a special type of fast-running model. In particular, the model may make determinations, through iterations, that give the model different parameters.

For example, the different parameters may include (1) stiffness of the pole 104, which varies with the age and species of the timber, (2) soil S, which varies with geography and/or field conditions such as saturation and clay versus sand, and (3) loss of structural stiffness due to the presence of decay below a ground line GL. Referring to the parameter for the loss of structural stiffness due to the presence of decay, this parameter may be referred to herein as the "decay parameter." The decay parameter can be defined using either a reduction in effective radius or cross-sectional area of the pole 104 to maintain a direct relationship with a physical parameter that can be linked to pole condition requirements in design standards. Operations according to embodiments of the present inventive concepts may provide an optimization scheme that searches for the extent of decay of the pole 104.

As an example, FIG. 1H illustrates using (Block 130) unknown/unsolved parameters (i) pole elastic modulus, E, (ii) soil elastic modulus, $E_s$, and (iii) decay parameter, $A_{loss}$ (or $r_{loss}$), as inputs to a physics model, such as a Rayleigh-Ritz model. Although a Rayleigh-Ritz model provides one example of a physics model that is fast to assemble, other physics models can be used to predict natural frequencies for poles 104 and can be used for parameter identification. The parameters (i)-(iii) may be the above-discussed parameters (1)-(3), respectively. Moreover, in some embodiments, the unknown/unsolved parameters may include supported mass of the pole 104 and/or added stiffness of the pole 104. Alternatively, supported mass of the pole 104 and/or added stiffness of the pole 104 may be known parameters.

Figure 2A:
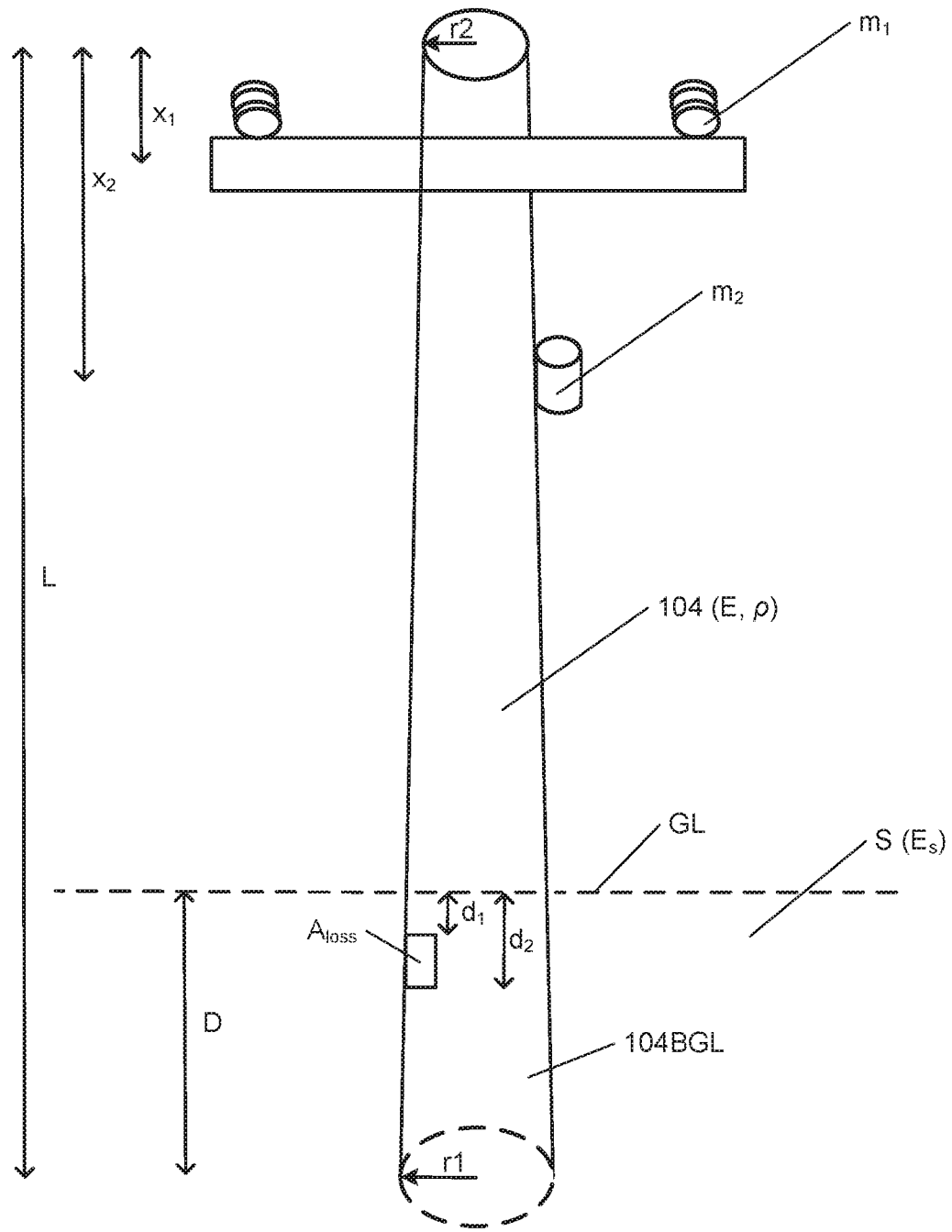
FIG. 2A is a diagram of a timber distribution pole for which vibration-based condition assessment can be performed according to embodiments of the present inventive concepts.

FIG. 1H also illustrates using (Block 120) known parameter values, such as pole length (L), pole base radius ($r_1$), pole top radius ($r_2$), pole embodiment depth (D), pole density ($\rho$), pole decay critical region, distance ($d_1$) from the ground line GL (e.g., from the top surface of the soil S) to the top of the decay area of the pole 104, distance ($d_2$) from the ground line GL to the bottom of the decay area of the pole 104, added stiffness, and/or the mass of supported infrastructure such as cross arms and lines ($m_1$) and transformers ($m_2$) and their respective locations ($x_1$ and $x_2$), into the physics model. The model can compensate for the mass and stiffness of supported infrastructure. Additionally or alternatively, the model can compensate for any ground line reinforcements. Operations of the present inventive concepts include solving for values of one or more unknown parameters of the pole 104, and the provision of more known parameter values can help solve for unknown parameter values. For example, by incorporating a relatively large amount of known data into the model, a better end estimate of decay below the ground line GL may be provided. Various examples of known parameters, including dimensions and other known parameters, of the pole 104 are illustrated in FIG. 2A. In particular, FIG. 2A relates items in the flowchart of FIG. 1H, which illustrates operations of both detecting and quantifying the extent of decay below the ground line GL, to physical properties of the pole 104.

Referring to FIG. 1H, the physics model uses (Block 140) the known parameters to build mass and stiffness matrices for the pole 104. The model then provides (Block 150) a model prediction for a number of the flexural natural (and/or anti-resonance) frequencies of the pole 104. Moreover, correlation (Block 160) between the vibration measurement and the model prediction is determined. A determination (Block 170) of whether optimization has converged on a best solution is then made. If the answer is yes, then a solution is provided (Block 180) for the parameters E, $E_s$, and $A_{loss}$. Blocks 170 and 180 are not limited, however, to solving for these three parameters. For example, in some embodiments, the operation(s) of Blocks 170 and 180 may include solving for the influence of electrical conductors. Accordingly, the operation(s) of Blocks 170 and 180 of FIG. 1H (or Block 180D of FIG. 1G) may include using natural frequencies and/or anti-resonance frequencies from the vibration measurement to identify one or more among a plurality of unknown parameter values for the physics model through an optimization algorithm.

In comparison with the optimization scheme of FIG. 1H, some conventional techniques have predicted decay by directly comparing measured natural frequencies to a database. Such conventional techniques often used either no analytical/physics model at all, or only a very simple model. The optimization scheme of FIG. 1H, however, may consider independent, separate parameters for (1) soil conditions, (2) mechanical properties of the pole 104, and (3) pole decay.

The model according to various embodiments of present inventive concepts is sufficiently advanced that it does not use a direct mathematical equation to solve for the unknown parameters E, $E_s$, and $A_{loss}$. Rather, these parameters are solved iteratively and/or through an optimization algorithm. For example, a processor P of an electronic device 100 that is attached to the pole 104 may search for values of the parameters that result in the model most closely matching measured values/parameters of the pole 104. The search may require multiple iterations. As each prediction can be done in a fraction of a second (e.g., $\frac{1}{50}^{th}$ of a second), many iterations can be performed, and many cases may be tested, until a strong correlation with what was measured in the field is obtained. Accordingly, as direct measurements may be unavailable for parameters such as pole stiffness, soil condition (e.g., soil stiffness), and pole decay, the model according to various embodiments herein actively searches for these parameters.

Accordingly, the indication of decay (Block 190) may comprise a representation of the parameter $A_{loss}$ of a physics model of the pole 104, and operations (of Blocks 170 and 180) may include estimating the decay by iteratively solving for the value of the parameter $A_{loss}$, which may represent the loss of an area of the pole 104. Additionally or alternatively, operations (of Blocks 170 and 180) may include iteratively solving for unknown parameter values of the physics model representing an elastic modulus, E, of the pole 104 and an elastic modulus, $E_s$, of soil S adjacent the pole 104, respectively.

Measurements of the pole 104 (e.g., measurements in Block 110 and/or Block 120) may be performed in the field. Moreover, all calculations illustrated in FIG. 1H may be performed locally on a processor P, which may be a microprocessor, that is embedded with one or more sensors, such as one or more vibration sensors V. For example, the microprocessor and sensor(s) can be in an electronic device 100 that straps on to the pole 104, acquires the measurement(s), and does the post-processing. Although some data may be transmitted to an asset management center of an electric utility, a lineman 102 performing the measurement(s) locally, in the field, may be provided with a simple output indicating the result of the timber distribution pole condition assessment. For example, the electronic device 100 may illuminate a green indicator light IL (indicating that it is safe to climb the pole 104) or a red indicator light IL (indicating that further/formal condition assessment of the pole 104 should be conducted before climbing the pole 104). If the electronic device 100 indicates severe decay (e.g., via a red indicator light IL), then the pole 104 can be prioritized for removal and replacement, after performing boring/excavation of the pole 104 to confirm the result of the electronic device 100.

In some embodiments, the analytical/physics model may account for the tapered geometry of the pole 104 by measuring pole circumference at two different elevations, and then assuming a linear change in the radius of the pole as 104 a function of pole height. Accordingly, input parameters to the model may include pole radius at one or more heights of the pole 104. Other direct inputs to the model may include pole geometries such as pole length and depth of pole embodiment, as well as masses, including the weight of transformers, that are attached to the pole 104. Some direct inputs can be determined in the field based on the class of the pole 104. Moreover, some information for direct inputs may be visibly stamped on the pole 104.

Referring to FIG. 1I, any of the operations of FIG. 1G or FIG. 1H may, in some embodiments, be preceded by receiving (Block 105) at the electronic device 100, via a short-range wireless communications link with another electronic device 103 of the user 102, a user input from the user 102. For example, operation(s) of estimating (Block 180D) the decay, and/or of measuring (Block 110) vibration, may be performed in response to receiving (Block 105) the user input.

Referring to FIG. 1J, the operations of FIG. 1G or FIG. 1H may include identifying (Block 185) a structurally weaker one of a first axis (e.g., Axis 1 of FIG. 1B) and a second axis (e.g., Axis 2 of FIG. 1B) of a pole 104 by comparing a decay parameter for the first axis with a decay parameter for the second axis. In some embodiments, the identifying (Block 185) operation(s) may be performed in response to completing the estimating (Block 180D of FIG. 1G or Blocks 170 and 180 of FIG. 1H) operation(s). Moreover, as successful convergence by the optimization (Block 170) of FIG. 1H results in one or more estimated parameter values (Block 180), these two blocks represent operation(s) and result(s), respectively, rather than different respective operations. Accordingly, the estimated parameter values (Block 180) do not require any additional operation beyond the optimization (Block 170).

Upon identifying (Block 185) the weaker axis, an electric utility may physically reinforce (Block 195) a portion of an outer surface 104S of the pole 104 that is intersected by the weaker axis. Testing for two directions of motion can help to locate where to reinforce the pole 104 because it identifies the weak axis of bending. Multiple vibration tests/measurements can be performed with respect to one or more axes, and they do not have to be simultaneous. Rather, the electronic device 100 can be moved vertically to repeat the test (e.g., to repeat the vibration measurement of Block 110) with respect to one or more axes at a different elevation at a different time. Alternatively, the electronic device 100 may include different vibration sensors V at different vertical and/or circumferential positions of the pole 104 and may be configured to repeat the test without requiring a user 102 to move the electronic device 100. Moreover, in the outputting (Block 190 of FIG. 1G or FIG. 1H) operation(s), the electronic device 100 can output an indication to a user 102 (or to an office) regarding which side of the pole 104 should be reinforced.

In some embodiments, the reinforcement (Block 195) operation(s) may be performed in response to completing the outputting (Block 190 of FIG. 1G or FIG. 1H) operation (s). Moreover, although FIGS. 1I and 1J individually illustrate details that may be added to operations in FIGS. 1G and 1H, any of the added details of FIGS. 1I and 1J may be combined with each other.

FIG. 2A is a diagram of a timber distribution pole 104 for which vibration-based condition assessment can be performed according to embodiments of the present inventive concepts. As discussed herein with respect to FIG. 1H, one or more known parameters of the pole 104 that are illustrated in FIG. 2A may be provided (Block 120) to a physics model, such as a Rayleigh-Ritz model, of the pole 104. Moreover, FIG. 2A illustrates an example of $A_{loss}$, which may represent the loss of an area of the pole 104 below a ground line GL. In particular, $A_{loss}$ may be an unknown decay parameter that is estimated (Block 180D of FIG. 1G or Blocks 170 and 180 of FIG. 1H) and is proportional to the area of section loss of the pole 104. Alternatively, the decay parameter may, in some embodiments, be $r_{loss}$, which is proportional to a radius of the loss of the pole 104.

Figure 2B:
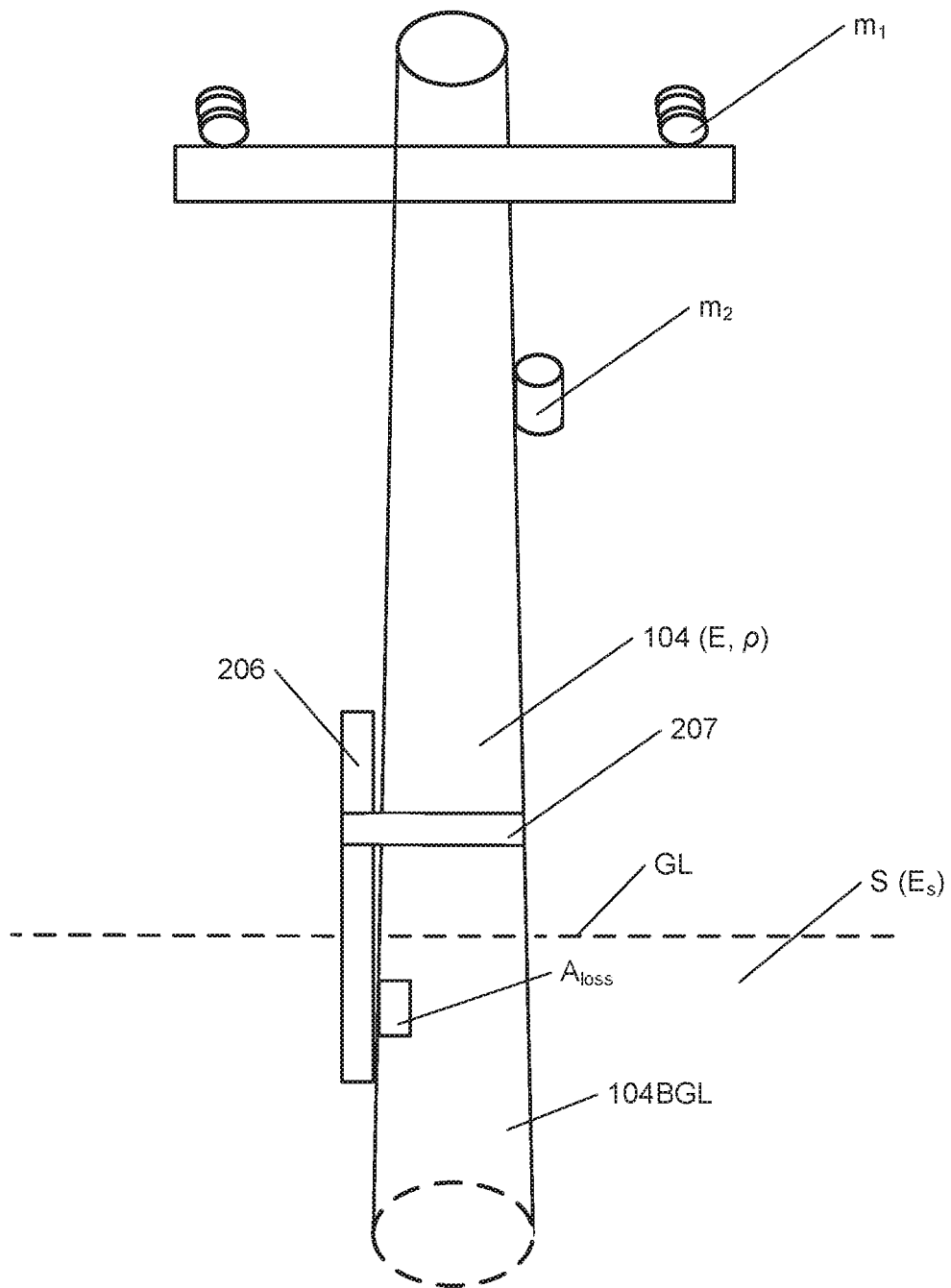
FIG. 2B is a diagram of a timber distribution pole that is physically reinforced according to embodiments of the present inventive concepts.

FIG. 2B is a diagram of a timber distribution pole 104 that is physically reinforced according to embodiments of the present inventive concepts. As discussed with respect to the reinforcement (Block 195) operation(s) of FIG. 1J, a relatively weak portion of the pole 104 may be physically/structurally reinforced. For example, if the decay is moderate (e.g., moderate section loss such that the pole 104 is still serviceable), then the pole 104 may be reinforced rather than replaced. FIG. 2B shows an example of a physical reinforcement 206 that may be provided adjacent an area of decay. In particular, the physical reinforcement 206 may extend below a ground line GL adjacent an area of decay that is below the ground line GL. The physical reinforcement 206 may also extend about 4 feet to about 5 feet above the ground line GL. As an example, the physical reinforcement 206 may be a metal reinforcement that is driven into soil S next to the pole 104. In some embodiments, a portion of the physical reinforcement 206 that is above the ground line GL may be strapped to the pole 104 via a strap 207.

Conventional formal techniques of pole condition assessment may involve excavation. A lineman 102, however, does not want to excavate soil S around a timber distribution pole 104. Not only is excavation time-consuming, but excavating the soil S may expose the pole 104 and the soil S to agents that introduce decay. This may provide a pathway for moisture and/or fungus to develop in an area where decay prevention is desired.

Moreover, conventional informal techniques of pole condition assessment may be incomplete and inexact. For example, conventional vibration-based methods are too simplified to determine the severity of decay of a pole 104. Whereas embodiments herein may determine independent, separate solutions for support condition of a pole 104, soil condition, and pole decay, conventional techniques are unable to determine what values to attribute to different unknowns (e.g., soil condition versus pole decay). Embodiments herein are thus able to parse out the individual impact/contribution of these different parameters at a high level of resolution.

Embodiments herein have been discussed, by way of example, in the context of timber distribution poles 104. Vibration responses of other structures (e.g., a building or a bridge), however, could be taken using techniques similar to those for timber distribution poles 104. Accordingly, in some embodiments, the physics model described herein may be used to determine solutions for unknown parameter values for bridge piers or other structural columns. As an example, although FIG. 1G illustrates operations of vibration-based condition assessment with respect to a pole 104, operations of vibration-based condition assessment of a structure (i.e., not limited to the pole 104) can include performing, at an electronic device 100 that is attached to the structure, a vibration measurement of the structure; estimating, at the electronic device 100, a solution for an unknown parameter value of the structure, using the vibration measurement and a physics model of the structure; and outputting, at the electronic device 100, an indication of the unknown parameter value of the structure to a user 102 of the electronic device 100.

An electronic device 100 according to embodiments of the present inventive concepts may provide a number of advantages. These advantages include nondestructive vibration measurements. Accordingly, an electronic device 100 according to embodiments of the present inventive concepts may be a nondestructive inspection tool. In particular, a vibration measurement described herein may be performed via the tool 100 independently of boring into a timber distribution pole 104 and independently of excavating soil S that is adjacent (e.g., within a one-foot radius of an outer surface 104S of) the pole 104. For example, the vibration measurement may be performed via the tool 100 in the absence of (and/or before) boring into the pole 104 and in the absence of (and/or before) excavation of the soil S adjacent the pole 104. In contrast, if ultrasonic transducers were instead used to locate pole decay, soil excavation may be required around the pole 104 to place the transducers around the pole 104.

Referring again to the outputting (Block 190) operation(s) of FIGS. 1G and 1H, the output of a nondestructive inspection tool 100 may comprise decay (e.g., decay parameter, $A_{loss}$) of a pole 104 on a scale of 0 to 100. In particular, a value of the decay may represent the loss of the area of a cross-section of the pole 104 below a ground line GL, where a value of 100 represents the most severe (i.e., total decay) loss and a value of 0 represents no decay/cross-section loss. The tool 100 can store and/or transmit this data. For example, the tool 100 can illuminate an LED on the tool 100 or otherwise display to the user 102 whether the pole is safe to climb. In some embodiments, a value of 33, which represents 33% cross-section loss, may be the threshold for determining whether to climb the pole 104 or replace the pole 104. For example, moderate decay may be defined as less than 33% cross-section loss. Moreover, in some embodiments, the percent loss of a cross-section of the pole 104 may be tracked over multiple years, thus facilitating a prediction of how long the pole 104 will last before requiring replacement.

In some embodiments, boring into a timber distribution pole 104 and/or excavating S soil adjacent the pole 104 may be performed after outputting (Block 190 of FIGS. 1G and 1H) an indication of decay, to verify the presence of the decay. Such verification, however, may be omitted in some embodiments. Accordingly, any of the operations described herein with respect to FIG. 1G or 1H may be performed in the absence of boring and soil excavation.

Moreover, a nondestructive inspection tool 100 may facilitate a vibration-based technique that is very quick. In particular, the tool 100 can quickly test the health of a pole 104 and indicate to a user 102 of the tool 100 whether the pole 104 is safe to climb. The tool 100 is also portable and has a relatively low cost, thus increasing the ease with which the tool 100 may be broadly implemented across a workforce of users 102, such as electric utility linemen. In some embodiments, vibration measurements from two axes of response, and/or measurements that use both natural and anti-resonance frequencies, may enhance the identification of decay of the pole 104. Accordingly, the tool 100 may be an accurate, low-cost, portable, user-friendly, and rapid nondestructive inspection tool for timber distribution poles 104.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A first electronic device configured to perform vibration-based condition assessment of a timber distribution pole, the first electronic device comprising:
    a vibration sensor configured to perform a vibration measurement of the timber distribution pole;
    wireless communications circuitry configured to provide wireless communications with a second electronic device that is spaced apart from the timber distribution pole;
    a processor;
    a storage medium coupled to the processor and comprising computer readable program code that when executed by the processor causes the processor to perform operations comprising estimating decay of the timber distribution pole, using the vibration measurement and a physics model of the timber distribution pole; and
    an output interface configured to output an indication of the decay of the timber distribution pole to a user of the first electronic device,
    wherein the decay comprises a first unknown parameter value of the physics model,
    wherein estimating the decay comprises iteratively solving for the first unknown parameter value, and
    wherein the operations further comprise iteratively solving for second and third unknown parameter values of the physics model representing an elastic modulus of the timber distribution pole and an elastic modulus of soil adjacent the timber distribution pole, respectively.

2. The first electronic device of claim 1,
    wherein the indication of the decay comprises an indication of whether it is safe for the user to climb the timber distribution pole,
    wherein the output interface comprises an indicator light, a speaker, and/or a display screen of the first electronic device that is configured to output the indication of whether it is safe for the user to climb the timber distribution pole, and
    wherein the physics model further comprises a fourth unknown parameter value.

3. The first electronic device of claim 1, wherein the vibration sensor comprises an accelerometer comprising a full-scale range of at least +/−20 g of acceleration and a bandwidth of at least 200 Hertz.

4. The first electronic device of claim 1, further comprising:
    a housing comprising a curved attachment surface that is attachable to a curved outer surface of the timber distribution pole.

5. The first electronic device of claim 1, wherein the wireless communications circuitry comprises Wi-Fi circuitry, Bluetooth circuitry, and/or cellular communications circuitry.

6. The first electronic device of claim 1, wherein the first unknown parameter value represents loss of an area of the timber distribution pole that is below a ground line of the timber distribution pole.

7. A method of vibration-based condition assessment of a timber distribution pole, the method comprising:
    performing, at an electronic device that is attached to the timber distribution pole, a vibration measurement of the timber distribution pole, independently of boring into the timber distribution pole and independently of excavating soil adjacent the timber distribution pole;
    estimating, at the electronic device, decay of the timber distribution pole, using the vibration measurement and a physics model of the timber distribution pole; and
    outputting, at the electronic device, an indication of the decay of the timber distribution pole to a user of the electronic device,
    wherein the decay comprises a first unknown parameter value of the physics model,
    wherein estimating the decay comprises iteratively solving for the first unknown parameter value,
    wherein the first unknown parameter value represents loss of an area of the timber distribution pole that is below a ground line of the timber distribution pole, and
    wherein the method further comprises iteratively solving for second and third unknown parameter values of the physics model representing an elastic modulus of the timber distribution pole and an elastic modulus of soil adjacent the timber distribution pole, respectively.

8. The method of claim 7, wherein known parameter values of the physics model comprise values representing embedment of the timber distribution pole, density of the timber distribution pole, and one or more dimensions of the timber distribution pole.

9. The method of claim 8, wherein the known parameter values of the physics model further comprise a value representing supported mass and/or a value representing added stiffness.

10. The method of claim 7,
    wherein the first, second, and third unknown parameter values are among a plurality of unknown parameter values of the physics model, and
    wherein the plurality of unknown parameter values further comprises a fourth unknown parameter value representing supported mass and/or a fifth unknown parameter value representing added stiffness.

11. The method of claim 7,
    wherein the indication of the decay comprises an indication of whether it is safe for the user to climb the timber distribution pole, and
    wherein outputting the indication of the decay comprises illuminating an indicator light of the electronic device, providing sound via a speaker of the electronic device, and/or displaying a representation of the decay via a display screen of the electronic device, to provide the indication of whether it is safe for the user to climb the timber distribution pole.

12. The method of claim 7, wherein outputting the indication of the decay comprises transmitting, via a short-range wireless communications link, data representing the decay to another electronic device of the user.

13. The method of claim 7, further comprising:
receiving, via a short-range wireless communications link with another electronic device of the user, a user input from the user, wherein the vibration measurement and/or estimating the decay is performed in response to receiving the user input.

14. The method of claim 7, wherein performing the vibration measurement comprises measuring, via an accelerometer of the electronic device comprising a full-scale range of at least +/−20 g of acceleration and a bandwidth of at least 200 Hertz, natural and anti-resonance frequencies while the electronic device is attached to the timber distribution pole at an elevation that is in a range of about 4 feet to about 6 feet relative to a ground line of the timber distribution pole.

15. The method of claim 7, wherein iteratively solving for the first, second, and third unknown parameter values comprises using natural frequencies and/or anti-resonance frequencies from the vibration measurement to identify the first, second, and third unknown parameter values through an optimization algorithm.

16. A method of vibration-based condition assessment of a timber distribution pole, the method comprising:
performing, at an electronic device that is attached to the timber distribution pole, a vibration measurement of the timber distribution pole, independently of boring into the timber distribution pole and independently of excavating soil adjacent the timber distribution pole;
estimating, at the electronic device, decay of the timber distribution pole, using the vibration measurement and a physics model of the timber distribution pole; and
outputting, at the electronic device, an indication of the decay of the timber distribution pole to a user of the electronic device,
wherein performing the vibration measurement comprises performing a first vibration measurement of the timber distribution pole with respect to a first axis that extends through the timber distribution pole,
wherein the method further comprises performing a second vibration measurement of the timber distribution pole with respect to a second axis that extends through the timber distribution pole and intersects the first axis,
wherein estimating the decay comprises:
estimating a first decay parameter value of the timber distribution pole with respect to the first axis; and
estimating a second decay parameter value of the timber distribution pole with respect to the second axis, and
wherein the method further comprises:
identifying a structurally weaker one of the first axis and the second axis by comparing the first decay parameter with the second decay parameter; and
physically reinforcing a portion of an outer surface of the timber distribution pole that is intersected by the structurally weaker one of the first axis and the second axis.

17. The method of claim 16, wherein the first and second vibration measurements are performed while the electronic device is attached to the timber distribution pole at an elevation in a range of about 4 feet to about 6 feet relative to a ground line of the timber distribution pole.

18. An electronic nondestructive inspection tool for timber distribution poles, the electronic nondestructive inspection tool comprising:
a vibration sensor configured to perform a vibration measurement of a timber distribution pole;
a processor configured to perform operations comprising:
estimating decay of the timber distribution pole by iteratively solving for one or more unknown parameter values of a physics model of the timber distribution pole that result in frequencies that are predicted by the physics model most closely matching the vibration measurement;
wherein the one or more unknown parameter values comprises first, second, and third unknown parameter values, wherein the second and third unknown parameter values represent an elastic modulus of the timber distribution pole and an elastic modulus of soil adjacent the timber distribution pole, respectively; and
outputting an indication of the decay of the timber distribution pole to a user of the electronic nondestructive inspection tool.

19. The electronic nondestructive inspection tool of claim 18, further comprising:
wireless short-range communications circuitry configured to provide wireless short-range communications with a portable electronic device of the user,
wherein the wireless short-range communications comprise data representing the indication of the decay of the timber distribution pole,
wherein the vibration sensor comprises an accelerometer comprising a full-scale range of at least +/−20 g of acceleration and a bandwidth of at least 200 Hertz, and
wherein the physics model compensates for a mass and/or a stiffness of supported infrastructure and/or compensates for any ground line reinforcements.

20. The electronic nondestructive inspection tool of claim 18, further comprising:
an output interface configured to visibly and/or audibly output the indication of the decay of the timber distribution pole to the user; and
a storage medium coupled to the processor and comprising computer readable program code that when executed by the processor causes the processor to perform the operations.

21. The electronic nondestructive inspection tool of claim 18, wherein the first unknown parameter value represents loss of an area of the timber distribution pole that is below a ground line of the timber distribution pole.

22. The electronic nondestructive inspection tool of claim 18, wherein iteratively solving for the one or more unknown parameter values comprises using natural frequencies and anti-resonance frequencies from the vibration measurement to identify the one or more unknown parameter values.

* * * * *